(12) United States Patent
Bae et al.

(10) Patent No.: US 8,113,955 B1
(45) Date of Patent: Feb. 14, 2012

(54) GAME SERVICE SYSTEM

(75) Inventors: Kuk Ho Bae, Kycongsangbuk-Do (KR);
Kwang Chul Ju, Kycongsangbuk-Do (KR)

(73) Assignee: LG Electronics Inc., Seoul (KR)

(*) Notice: Subject to any disclaimer, the term of this patent is extended or adjusted under 35 U.S.C. 154(b) by 2739 days.

(21) Appl. No.: 09/709,574

(22) Filed: Nov. 13, 2000

(30) Foreign Application Priority Data

Nov. 13, 1999 (KR) .................................. 1999-50474

(51) Int. Cl.
*A63F 13/00* (2006.01)
(52) U.S. Cl. ................. 463/42; 463/40; 463/41
(58) Field of Classification Search ............. 463/40–42
See application file for complete search history.

(56) References Cited

U.S. PATENT DOCUMENTS

| | | | | | |
|---|---|---|---|---|---|
| 4,126,851 | A | * | 11/1978 | Okor | 463/31 |
| 4,866,515 | A | * | 9/1989 | Tagawa et al. | 725/77 |
| 5,489,103 | A | * | 2/1996 | Okamoto | 463/29 |
| 5,654,746 | A | * | 8/1997 | McMullan et al. | 725/29 |
| 5,935,004 | A | * | 8/1999 | Tarr et al. | 463/40 |
| 5,944,608 | A | * | 8/1999 | Reed et al. | 463/40 |
| 6,005,561 | A | * | 12/1999 | Hawkins et al. | 715/500.1 |
| 6,320,868 | B1 | * | 11/2001 | Okano et al. | 370/442 |
| 6,446,262 | B1 | * | 9/2002 | Malaure et al. | 725/141 |
| 6,513,160 | B2 | * | 1/2003 | Dureau | 725/9 |
| 2002/0129374 | A1 | * | 9/2002 | Freeman et al. | 725/91 |

FOREIGN PATENT DOCUMENTS

| | | |
|---|---|---|
| JP | 07-073124 | 3/1995 |
| JP | 08-101671 | 4/1996 |
| JP | 10-228429 | 8/1998 |
| JP | 11-163810 | 6/1999 |
| JP | 11-308582 | 11/1999 |

OTHER PUBLICATIONS

Lazzuri, Jeff & Stan Gutowski. "EE 4984 Telecommunication Networks Project 1 Sega Channel". May 5, 1994 [online], [retrieved on Nov. 13, 2003]. Retrieved from the Internet: <http://fiddle.visc.vt.edu/courses/ee494/Projects1995/gutolazz.html>.*
Chinese Office Action dated Dec. 3, 2004 and Partial English Translation.

* cited by examiner

*Primary Examiner* — James McClellan
(74) *Attorney, Agent, or Firm* — Ked & Associates LLP

(57) ABSTRACT

A game service system is provided for transmitting and receiving a broadcast signal and reproducing an image and an audio signal. This system allows a user not only to view TV programs broadcasted from a broadcasting station, but also to order a desired game program, receive the selected game program from a broadcasting station, and execute the selected game program. In addition, because the game program can be transmitted through the broadcasting media, a plurality of users can receive a desired game program.

11 Claims, 7 Drawing Sheets

FIG. 5

| Syntax |
|---|
| game_list_descriptor(){<br>    for(i=0; i<N,i++){<br>        game_id<br>        game_name_length<br>        for(i=0; i<M,j++){<br>            game_name_char<br>        }<br>        game_program_PID<br>    }<br>} |

GAME SERVICE SYSTEM

BACKGROUND OF THE INVENTION

1. Field of the Invention

The present invention relates to a game service for transferring a game program desired by a user to the user's digital television so that the user can execute the game.

2. Background of the Related Art

FIG. 1 is a schematic block diagram that illustrates a signal processing procedure of a digital television in accordance with a conventional art. As shown in the drawing, a user interface 20 outputs an actuating signal in response to a user request to allow the user to select a desired broadcast signal, a communication service or a chargeable broadcast.

When the actuating signal requests a communication service or chargeable broadcast, the microcomputer 19 controls a modem 18 to receive the communication service or the chargeable broadcast.

When the actuating signal requests a broadcast signal of a channel desired by the user, a microcomputer 19 controls a tuner 11 to select the broadcast signal of the desired channel. The tuner 11 selects a broadcast signal of the user requested channel from all the broadcast signals received through an antenna 10, and outputs the selected broadcast signal to a channel decoder 12. The channel decoder 12 demodulates the selected broadcast signal, corrects its error, converts it into a transport stream and outputs it to a common interface connector 13. In this respect, the "transport stream" refers to a digital signal that may include images, audio, data and broadcast information, all of which are multiplexed by packet unit on a time basis. Subsequently, the common interface (CI) connector 13 outputs the transport stream to the system decoder 15.

If the common interface (CI) connector 13 is connected with a chargeable broadcast receiving CA module 14, the common interface (CI) connector 13 may receive a signal from the chargeable broadcast receiving CA module 14. The chargeable broadcast receiving CA module 14 serves to provide the user with a communication service or a chargeable broadcast. That is, a common interface host, consisting of software stored in the microcomputer 19, the common interface connector 13, and hardware in the form of a control bus line, provides the chargeable broadcast receiving CA module 14 with protocols and a resource having some objects so that the chargeable broadcast receiving CA module 14 can provide the communication service or the chargeable broadcast. The resource includes a host control and interface resource to allow a user to request a broadcast signal of a different channel. The resource may also include a man-machine interface for use when a user's selection or input is required, or when information is to be provided to the user. The resource may further include a communication resource for use when a communication means such as a modem is required, and a system management resource for adjusting distribution between the common interface host and the common interface module.

The common interface host may require an additional resource to extend its function. Detailed standards related to the common interface are set forth in the European Standard EN50221.

The system decoder 15 demultiplexes the transport stream, extracts broadcast information from the transport stream and outputs it to the microcomputer 19. "Broadcast information" refers to information related to a tuning frequency required for receiving a broadcast, a packet identifier of an image, audio and data signals, and a broadcast schedule.

Thereafter, a source decoder 16 decodes the transport stream that has been demultiplexed by the system decoder 15, processes the decoded transport stream using a graphic processor of the source decoder 16, and outputs an image signal and an audio signal to a display and speaker unit 17. Then, upon receipt of the image and audio signals, the display and speaker unit 17 outputs a broadcast signal of the channel selected by the user, a communication service or a chargeable broadcast.

FIG. 2 is a block diagram showing a construction of the chargeable broadcast receiving CA module of FIG. 1. As shown in the drawing, first, the common interface serves like an expansion slot of a personal computer. When the user intends to add a new function, he or she may simply mount the common interface module. The common interface module would be developed to meet the requirement of a new function, and the currently developed module is a CA module for chargeable broadcasting.

Information exchanged between the digital television and the common interface module can include the transport stream input and output, and command interface data. The transport stream input is a digital broadcast signal received from a broadcasting station, and the transport stream output is a transport stream processed in the module. That is, a coded transport stream is received and then a decoded transport stream is outputted.

A command interface for exchanging command interface data provides a path to designate an operation to be performed and to exchange state information. For example, when it is necessary to ask the user whether he or she would like to receive a chargeable broadcast, the common interface module transfers the inquiry command through the command interface to the host (the digital television). The host transfers the user's answer to the common interface module. In this respect, the common interface module is an external instrument mounted in the common interface connector. The host is an aggregate for supporting the common interface, and is installed in the digital television.

However, the chargeable broadcast CA module of the digital television in the conventional art has a problem in that it only provides the user with a communication service or a chargeable broadcast.

In addition, though the common interface connector is capable of offering various services to the user, the common interface module fails to meet the expectations in providing users with various service functions. That is, for example, the conventional digital television does not offer a function to receive and execute game programs desired by the user.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a game service transmitting device for transmitting a broadcast signal and a game program according to a user's selection.

Another object of the present invention is to provide a game service receiving device for receiving a game program through a common interface module from a broadcasting station so that a user can execute a game.

To achieve these and other advantages, and in accordance with the purpose of the present invention, as embodied and broadly described herein, a game service transmitting device embodying the invention may include: a multiplexer configured to convert image and audio information, game programs, and game-related information into a transport stream and to output it; and a transmitting unit for channel-coding the transport stream to modulate it, amplify it and transmit it.

A game service receiving device embodying the invention may include: a tuning unit configured to receive image and audio information, a game program ordered by a user, and game-related information. The receiving device would also be configured to select either the image and audio information corresponding to a channel desired by the user, or the game program ordered by the user. The game service receiving device may also include a common interface module configured to demodulate the selected game program, and the game-related information. The receiving device may also be configured to error correct the received game program, to download the game program, and to process the game-related information.

A game service transmitting method embodying the invention could include the steps of: converting image and audio information, a game program and game-related information into a transport stream; coding the transport stream; and modulating and transmitting the transport stream over a certain channel.

A game service receiving method embodying the invention could include the steps of: extracting a game list of game-related information from image and audio information, a game program or the game-related information; downloading a game program according to the game-related information if the game is desired by the user, and executing the game.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings, in which like reference numerals refer to like elements, and wherein:

FIG. 5 illustrates a program for transmitting a game identifier and a game list adapted to the present invention;

DETAILED DESCRIPTION OF PREFERRED EMBODIMENTS

Reference will now be made in detail to the preferred embodiments of the present invention, examples of which are illustrated in the accompanying drawings.

Figure 1:
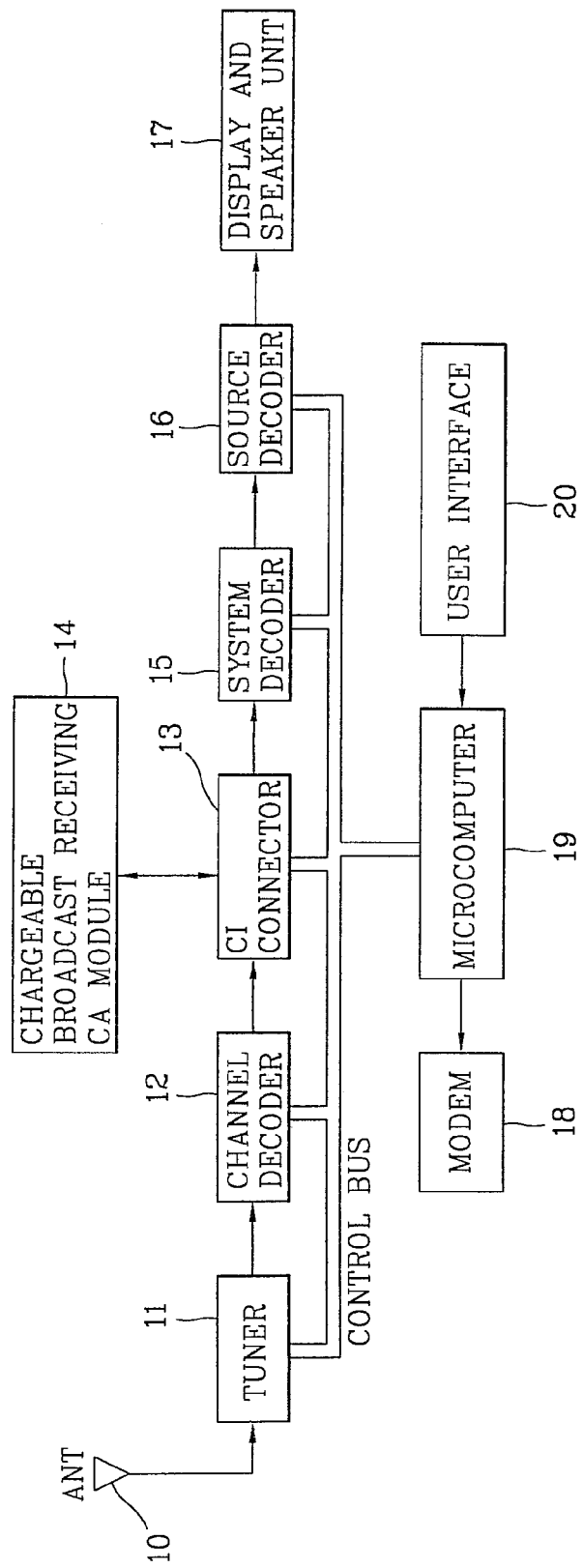
FIG. 1 is a schematic block diagram showing a signal processing procedure of a background art digital television.
Figure 2:
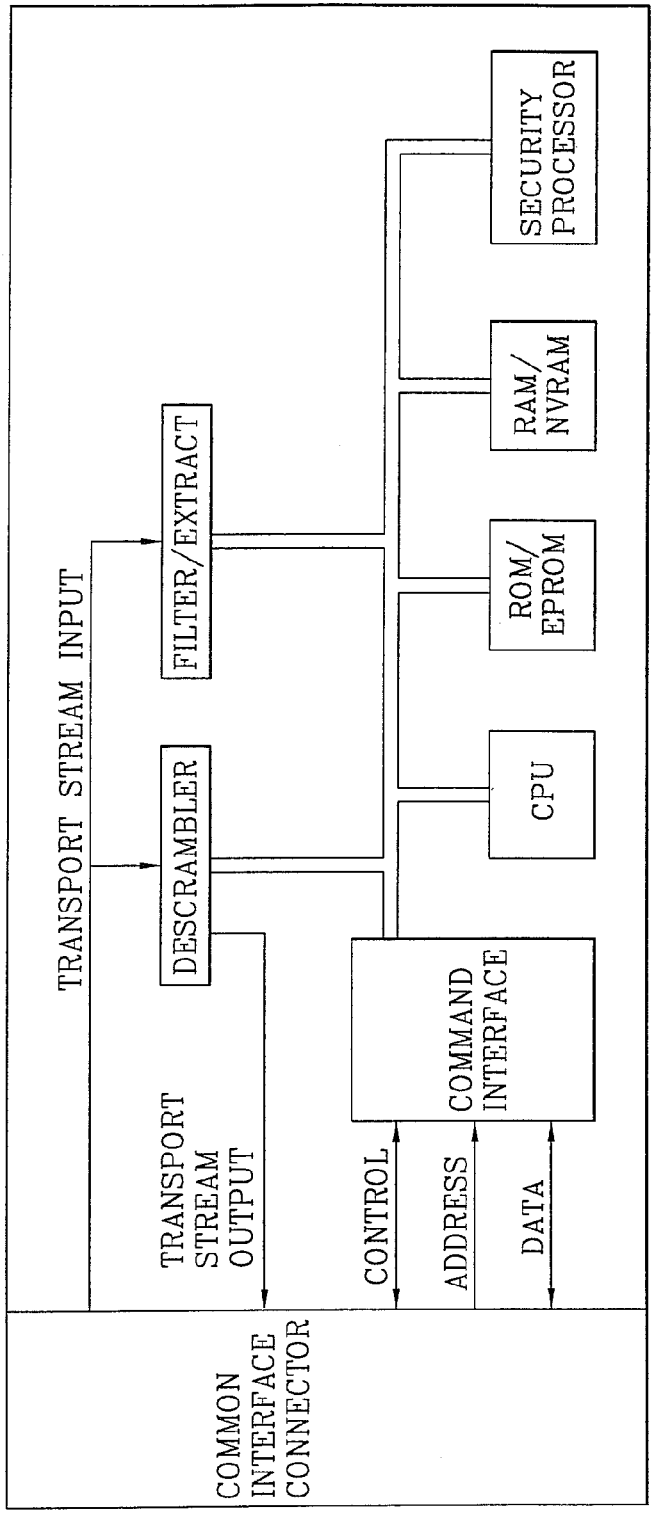
FIG. 2 is a detailed block diagram showing a construction of the chargeable broadcast receiving CA module of the background art digital television illustrated in FIG. 1.
Figure 3:
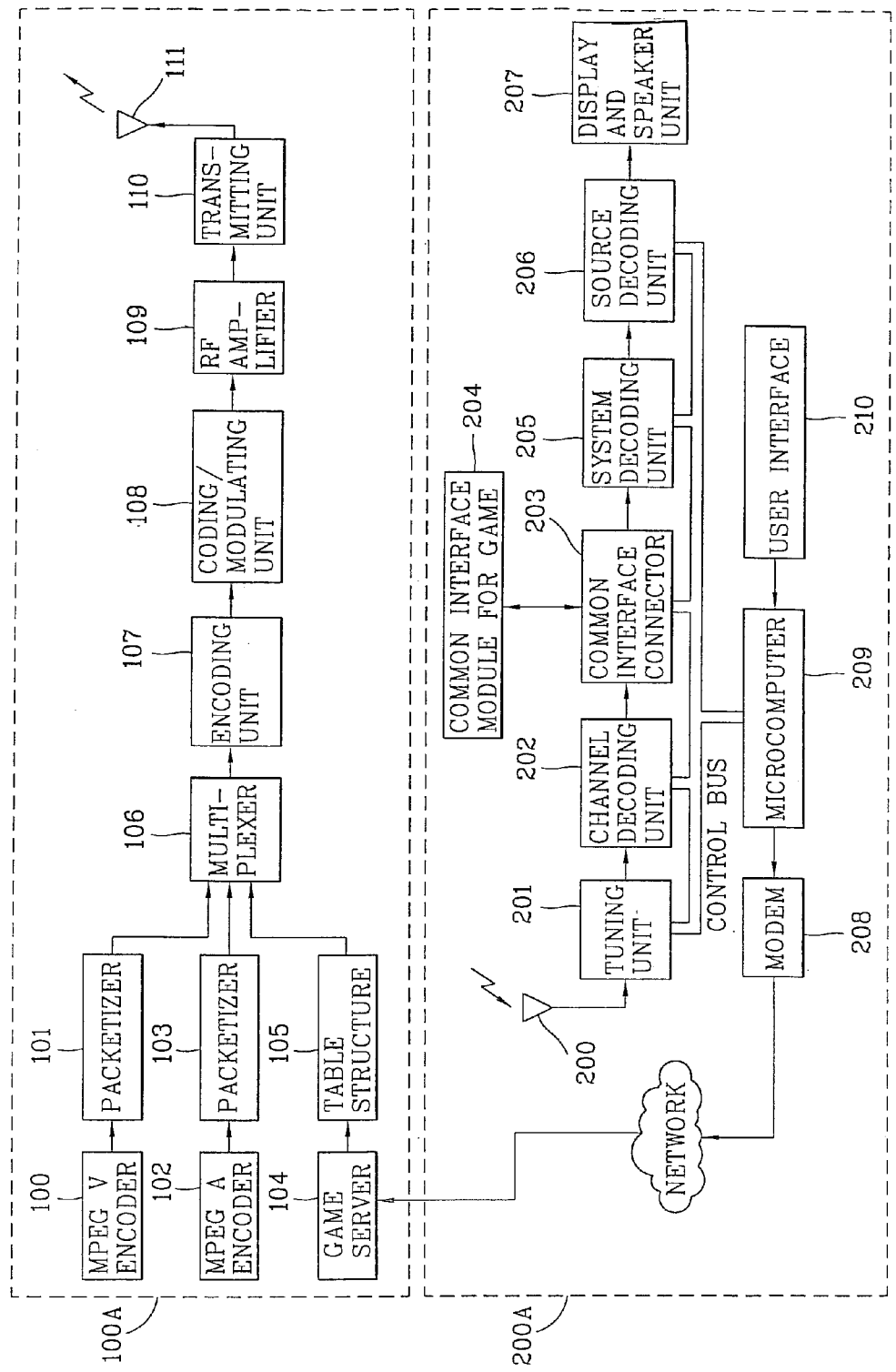
FIG. 3 is a schematic block diagram of a game service system in accordance with the present invention.

FIG. 3 is a schematic block diagram of a game service system in accordance with the present invention. As shown in the drawing, a transmitting unit 100A of a game service system embodying the invention includes an MPEG video encoder 100 for encoding an input image signal; a packetizer 101 for compressing the encoded image signal and packetizing it; and MPEG audio encoder 102 for encoding an input audio signal; a packetizer 103 for compressing the encoded audio signal and packetizing it; a game server 104 for providing a game program and game-related information; and a table structure 105 for making a table for the game information. A multiplexer 106 converts the packetized image and audio information, the game program and the game-related information into a transport stream and outputs it to an encoding unit 107. The encoding unit 107 encodes the converted transport stream. A coding/modulating unit 108 is used to channel code and modulate the encoded transport stream so that the signal can be transmitted over a certain channel. An RF amplifier 109 amplifies the modulated transport stream, and a transmitting unit 110 transmits the amplified transport stream through a transmitting antenna 111.

A receiving device 200A of game service system embodying the invention includes a user interface 210 that can be used by the user to select a certain channel, or to select a particular game. The user interface 210 then generates an actuation signal to indicate the selected channel or game. A microcomputer 209 receives the actuation signal from the user interface 210, and outputs either a first control signal to select a broadcast signal of the channel desired by the user, or a second control signal to order a game desired by the user. A modem 208 receives the second control signal and outputs a signal to order the game desired by the user. A tuning unit 201 receives the first control signal and selects either a broadcast signal of the channel selected by the user or a game program and associated information related to a game received in the transport stream. A channel decoding unit 202 is used to demodulate the broadcast signal of the channel selected by the user or the game program and the game-related information. The channel decoding unit 202 may also error correct the received signal, and convert the signal back into a transport system. A common interface module 204 receives the game program and the game-related information from the transport stream output from the channel decoding unit 202, downloads the game program, and processes the game-related information. A common interface connector 203 receives the transport stream from the channel decoding unit 202 and/or a signal output from the common interface module 204. A system decoding unit 205 demultiplexes the game program and the game-related information output from the common interface module and/or the transport stream output from the channel decoding unit 202. The system decoding unit 205 may operate to extract image and audio information for the broadcast signal of the channel selected by the user from the transport stream, and this data may be output to the microcomputer 209. A source decoding unit 206 decodes the demultiplexed transport stream, processes the decoded transport stream by means of an internal graphic processor, and outputs image and audio signals. A display and speaker unit 207 receives the image and audio signals from the source decoding unit 206 and outputs either a broadcast of the channel desired by the user, or a game ordered by the user.

The operation of the game service system will now be described in detail.

First, the MPEG video encoder 100 of the transmitter 100A encodes an input image signal and outputs it to the packetizer 101. The packetizer 101 compresses the encoded image signal and packetizes it. The MPEG audio encoder 102 encodes an input audio signal and outputs it to the packetizer 103. The packetizer 103 compresses the encoded audio signal and packetizes it. The game server 104 provides a user requested game program, and the game-related information. The table structure generator 105 makes a table for the game program and the game-related information and outputs the table. That is, the table structure generator 105 outputs the game program and the game-related information in the program form as shown in FIG. 5 to the multiplexer 106.

The multiplexer 106 converts the packetized image and audio information and the game program and the game-related information made in the program form into a transport stream and outputs the transport stream to the encoding unit 107. The transport stream is a digital signal which includes the image, audio and game data, multiplexed by packet unit on a time basis.

One method for generating the transport stream is disclosed in the international standard ISO/IEC 13818.

Subsequently, the encoding unit 107 encodes the transport stream output from the multiplexer 106, and outputs it to the coding/modulating unit 108. The coding/modulating unit 108 channel-codes the encoded transport stream, modulates it, and outputs it to the RF amplifier 109. The RF amplifier 109 amplifies the modulated transport stream and outputs it to the transmitting unit 110. The transmitting unit 110 then transmits the transport stream, amplified by the RF amplifier 109, through the transmitting antenna 111.

In the receiver device 200A, a user would interact with the user interface 210 to select a particular channel desired by the user, or a particular game desired by the user. The user interface 210 would then generate an actuation signal which would be received by the microcomputer 209. The microcomputer 209 then outputs either a first control signal to the tuning unit 201 to select a broadcast signal of the channel desired by the user, or a second control signal to the modem 208 to order the game desired by the user.

If the user selects a game, and the microcomputer has output a selected control signal to the modem 208, the modem outputs a signal to the game server 104 of the transmitting unit of the game service system, to order the game desired by the user.

If the user selects a channel for viewing, upon receipt of the first control signal from the microcomputer 209, the tuning unit 201 selects the broadcast signal of the channel selected by the user from among all the broadcast signals of each channel in the transport steam. Alternatively, if the user selects a game, the tuning unit 201 selects the game program and the game-related information. The selected stream of data is then output to the channel decoding unit 202. The channel decoding unit 202 demodulates the broadcast signal of the channel selected by the user, or the game program and the game-related information, corrects its error, and converts it into a transport stream that is output to the common interface connector.

The common game interface module 204 receives the transport stream outputted from the channel decoding unit 202, downloads the game program, and processes the game-related information. The common game interface module 204 and the common interface host (refer to FIG. 3) for proving information to execute a game of the common game interface module 204 will be described in detail with reference to FIG. 5.

If the common game interface module 204 is not connected with the common interface 203, the common interface connector 203 receives the transport stream from the channel decoding unit 202 and outputs it as it is. If the common game interface module 204 is connected with the common interface connector 203, the common interface connector 203 receives the signal outputted from the common game interface module 204.

The system decoding unit 205 demultiplexes the game program and the game-related information output from the common game interface module 204, and the transport stream output from the channel decoding unit 202. The demultiplexed information is then output to the source decoding unit 206, which extracts the image and the audio information corresponding to the broadcast signal of the channel selected by the user and outputs it. Specifically, the source decoding unit 206 decodes the transport stream, processes the decoded transport stream by means of a graphic processor of the source decoding unit 206, and outputs the image and audio signals to the display and speaker unit 207. The display and speaker unit 207 receives the image and audio signals from the source decoding unit 206 and outputs the broadcast of the channel desired by the user, or the game ordered by the user.

Figure 4:
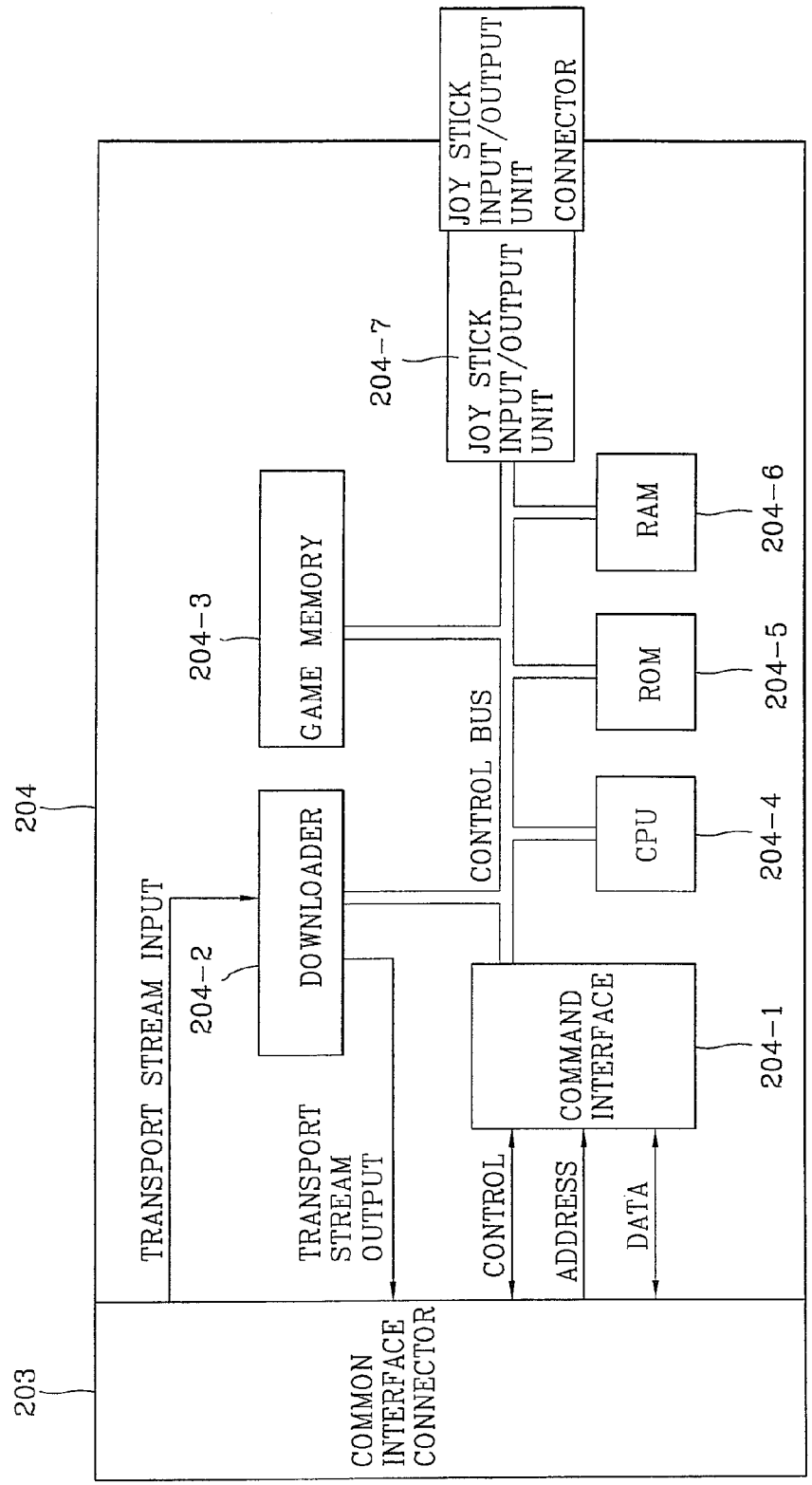
FIG. 4 is a detailed block diagram showing a construction of a common interface module for the game service system of FIG. 3.

FIG. 4 is a detailed block diagram showing a construction of a common game interface module 204 of FIG. 3. As shown in the drawing, the common game interface module 204 includes a downloader 204-2 for downloading a game program ordered by a user by using the game-related information in the transport stream that is output from the common interface connector 203. Also included is a game memory 204-3 for storing the downloaded game program. A CPU 204-4 is used to control input/output of the downloader 204-2 and the game memory 204-3. An input/output unit 204-7 allows the user to execute the stored game program and to adjust the executed game program. The input/output unit 204-7 could be a keyboard, a joystick, a mouse, a trackball, or any other type of input device that allows a user to input commands or information. A ROM 204-5 can be used to store a program for a common interface. A RAM 204-6 can be used for temporarily storing data required for performing the game program. A common interface unit 204-1 can be used to exchange addresses, data and operating commands between the common interface connector 203 and the downloader 204-2, the game memory 204-3, the input/output unit 204-7, the ROM, the RAM and the CPU 204-4.

FIG. 5 illustrates a program for transmitting a game identifier and a game list adapted to the present invention.

According to the program, a packet identifier (PID) for identifying a packet of a game program ordered by a user, and a game list consisting of game titles, as well as image and audio information for broadcasting are converted into the transport stream and transmitted to the receiving device of the game service system. The game list is then displayed on the screen and the packet identifier (PID) for identifying the packet downloads the game program ordered by the user.

First, the downloader 204-2 downloads the game program selected by the user by using the game-related information in the transport stream output from the common interface connector 203. That is, the downloader 204-2 extracts the packet identifier (PID) information of the game program ordered by the user by using the program as shown in FIG. 5. The downloader 204-2 then downloads the corresponding packets and stores them in the game memory 204-3. The stored packets signify the game program ordered by the user.

When the game program is completely stored in the game memory, the user can manipulate an input/output unit 204-7 to output an executing command to execute the stored game program. The input/output unit 204-7 will output a signal to execute the game in response to user acts in manipulating the input/output unit 207. Upon receipt of the executing command, the CPU 204-4 executes the game program stored in the game memory 204-3.

The ROM (204-5) stores the program for common interface, and the RAM 204-6 temporarily stores the data required for performing the game program. That is, the RAM 204-6 and the ROM 204-5 stores the information related to execution of the game.

The common interface unit 204-1 acts as a common interface host to exchange addresses, data and various operation commands between the common interface connector 203 and the downloader 204-2, the game memory 204-3, the input/output unit 204-7, the ROM 204-5, the RAM 204-6 and the CPU 204-4. The common interface host, consisting of software stored in the microcomputer 209, the common interface connector 203 and the hardware of the control bus line, provides a communication protocol and a resource consisting of several objects to perform the functions of the common game interface module 204. The resource includes a "host control and interface resource" to request a broadcast signal of a different channel, a "man-machine interface" for use when user selections are required or when information is to be provided to the user, a "communication resource" for use when a communication means such as a modem is required, and a "system management resource" for adjusting distribution between the common interface host and the common interface module.

A system embodying the invention may also include a game resource. The game resource would include several functional features. A "New Game Request" would be used to request a new game from the game server 104. A "Draw Background" would be used to send position information and graphic data to a host to allow the common game interface module 204 to renew the background screen. A "Move Background" would be used to send movement information and graphic data to renew or re-draw a portion of a display screen when the background screen of the game is slightly moved. A "Draw Foreground" would be used to display objects that are significantly moved. A "Move Foreground" would be used to send information on movement of the objects. Finally, a "Sound PCM Data" would be used for sound effects of the game.

Figure 6:
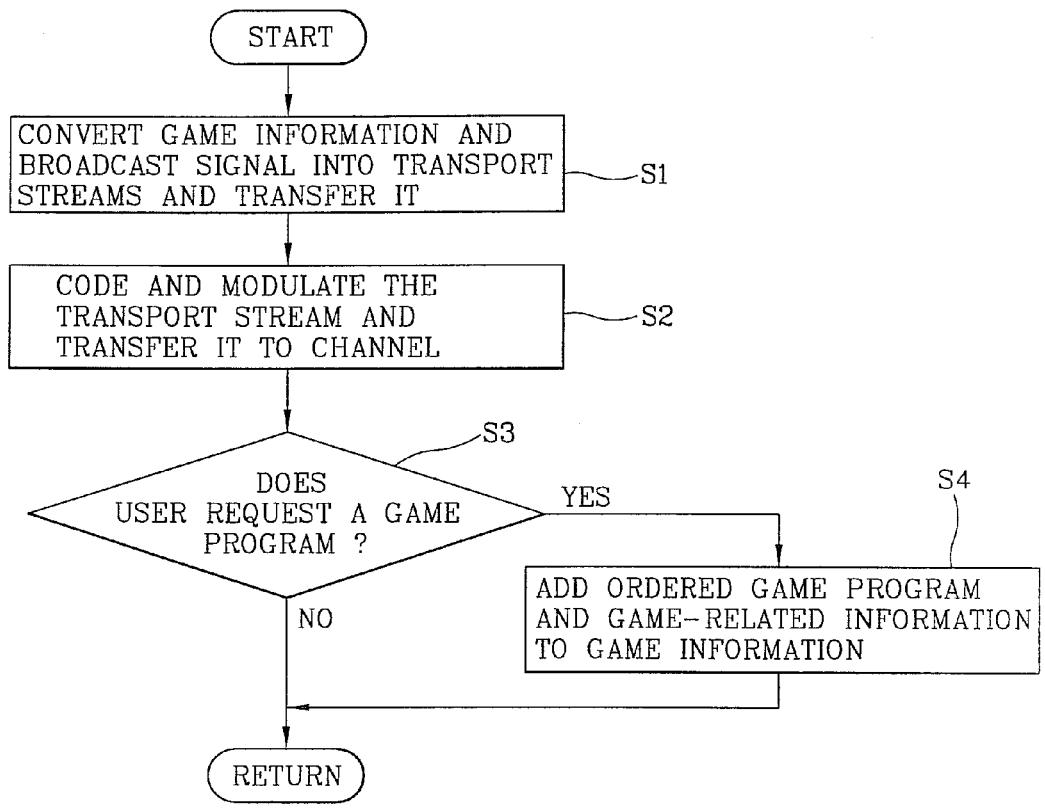
FIG. 6 is a flow chart of a game service transmitting method in accordance with the present invention.

FIG. 6 is a flow chart of a game service transmitting method in accordance with the present invention. First, in step S1, a broadcasting station converts image and audio information for broadcasting, as well as game program and game-related information into a data transport stream. The program shown in FIG. 5, indicating the packet identifier (PID) for identifying the packet of the game program ordered by the user and the list of the games, are added to the transport stream.

Thereafter, in step S2, the transport stream is coded and modulated so that it can be transmitted over a broadcast channel.

If a game desired by the user is not included in the game list, in step S3, it is judged whether the user requests a new game program. If the user orders a new game, in step S4, its game program and game-related information are added to the game list, and the game information is converted into the transport stream and then transmitted. That is, when the user orders a new game, the steps S1 and S2 are repeatedly performed to add the program of the ordered game and the game-related information.

Figure 7:
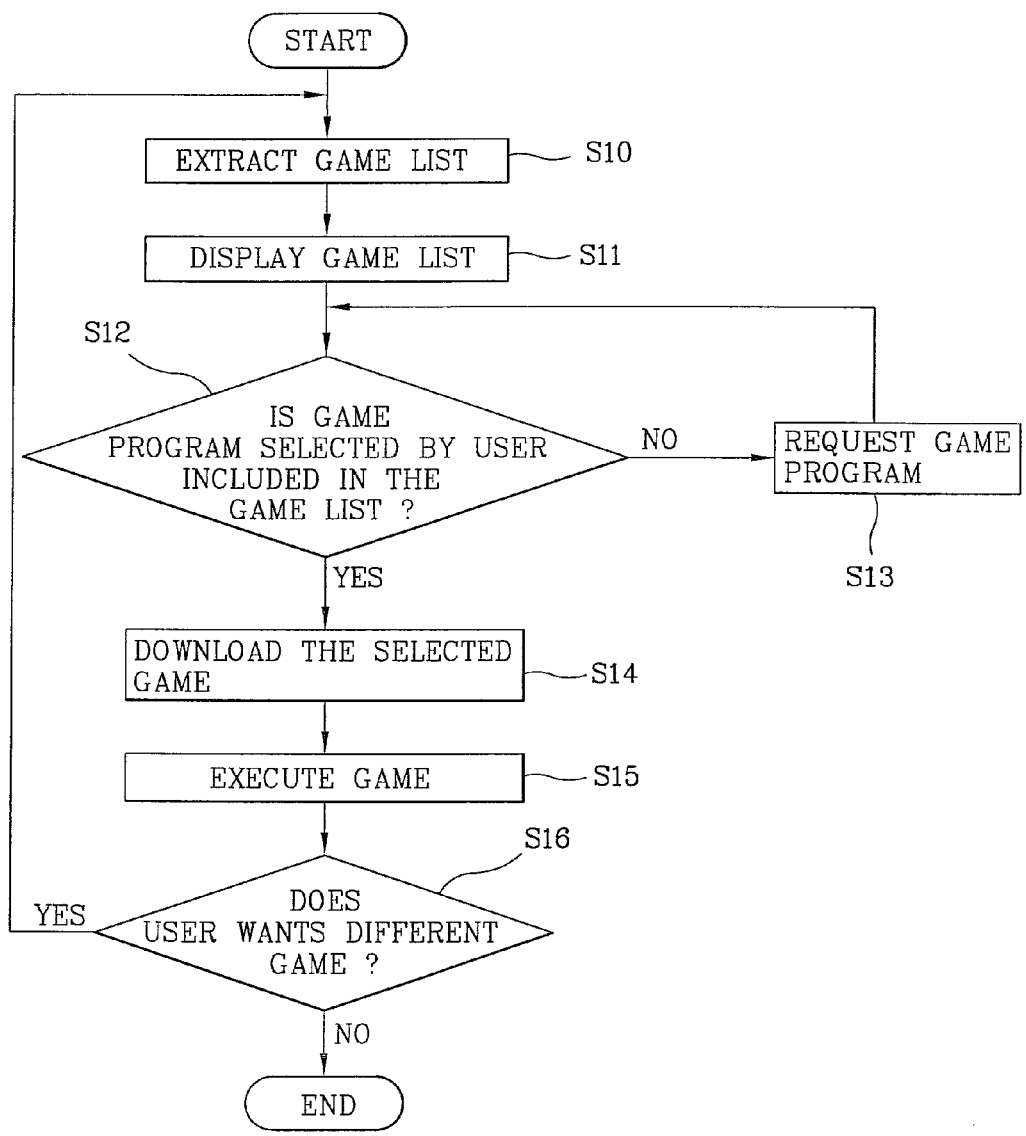
FIG. 7 is a flow chart of a game service receiving method in accordance with the present invention.

FIG. 7 is a flow chart of a game service receiving method in accordance with the present invention.

First, in step S10, the transport stream consisting of the image and audio information for broadcasting, and the game program and the game-related information output from the transmission antenna of the broadcasting station is received and the game list included in the game-related information of the transport stream is extracted. In step S11, the extracted game list is displayed on the screen of the user's television set. In step S12, it is judged whether a game program desired by the user is included in the game list displayed on the television screen.

If the game program desired by the user is not included in the list, in step S13, the user is requested to select a different game program. Meanwhile, in the judging step S12, if the game program desired by the user is included in the list, in step S14, the game program desired by the user is downloaded according to the game-related information in the transport stream, and the data is stored. In step S15, the stored game program is executed according to the execution command of the user.

Thereafter, in step S16, it is judged whether the game was ended, or the user desires a different game. If a different game is desired by the user, the method returns to the initial step S10. Otherwise, the process is ended.

In a game service system of the present invention, not only may the user view TV programs broadcast from the broadcasting station, but also the user may order a desired game from the broadcasting station, and then execute the game. In addition, since the game program can be transmitted through the broadcasting media, a plurality of users can receive a desired game program.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A game service system, comprising:
   a game service transmitting device, comprising:
   a multiplexer configured to convert image information and audio information of a broadcast signal, a game program, and game-related information into a transport stream, and
   a transmitting unit configured to channel-code, modulate, amplify, and transmit the transport stream; and
   a game service receiving device, comprising:
   a tuning unit configured to receive the image and audio information of the broadcast signal, a game program ordered by a user, and game-related information, and to select either the image and audio information corresponding to a broadcast channel desired by the user, or the game program ordered by the user; and
   a common game interface module configured to demodulate a selected game program and game-related information, to error correct the demodulated information, to download the game program and store the game program in a game memory portion of the common game interface unit for access by a user when desired, and to process the game-related information.

2. A game service transmitting device, comprising:
   a multiplexer configured to convert image and audio information of a broadcast signal, a game program, and game-related information by packet unit on a time basis into a transport stream; and
   a transmitting unit configured to channel-code the transport stream, and to modulate, amplify, and transmit the transport stream to a receiving unit when requested by a user.

3. A game server system, comprising a game service transmitting device configured to provide game programs and game-related information, wherein the game service transmitting device includes, a multiplexer configured to convert image information and audio information of a broadcast signal, a game program, and game-related information by packet unit on a time basis into a transport stream, and a transmitting unit configured to channel code, modulate, amplify, and transmit the transport stream.

4. The game server system according to claim 3, wherein the game server is configured to receive a game ordering signal indicating a game desired by a user, and to provide the selected game program and game-related information.

5. A game service transmitting method, comprising:
converting image and audio information of a broadcast signal, a game program, and game-related information by packet unit on a time basis into a transport stream;
coding the transport stream; and
amplifying, modulating, and transmitting the transport stream over a certain channel.

6. The method according to claim 5, wherein converting image and audio information of the broadcast signal, a game program, and game-related information by packet unit on a time basis into a transport stream further comprises:
adding a new game program desired by a user and game-related information to a previously established game list; and
converting the new game program and game-related information into a transport stream.

7. A game service receiving method, comprising:
extracting a game list comprising game-related information from a transport stream that includes time basis multiplexed packet units of image and audio information of a broadcast signal, a listing of game programs, and game-related information;
downloading a game program desired by a user according to the game-related information and storing the game program in a game memory portion of a receiving device; and
executing the game when desired by the user.

8. The method according to claim 7, further comprising requesting a game program desired by the user from a transmitting party when the game program desired by the user is not included in the extracted game list.

9. The method according to claim 7, wherein the game-related information comprises a packet identifier (PID) configured to identify a packet of a game program ordered by a user, and a game list.

10. The method according to claim 7, further comprising:
displaying the extracted game list on a display; and
requesting a game desired by the user from a transmitting party when the game program desired by the user is not included in the displayed game list.

11. A broadcast and game receiving device, comprising:
a downloader configured to receive a transport stream having time basis multiplexed packet units of image and audio info nation of a broadcast signal of a channel, a game program, and game-related information, and to download a game program ordered by a user using the game-related information encoded with the image and audio information of the broadcast signal;
a game memory configured to store the downloaded game program for access by a user when desired; and
a CPU configured to execute the stored game program in response to a user request.

* * * * *